United States Patent
Sun et al.

(10) Patent No.: US 8,866,837 B2
(45) Date of Patent: Oct. 21, 2014

(54) ENHANCEMENT OF IMAGES FOR DISPLAY ON LIQUID CRYSTAL DISPLAYS

(75) Inventors: Shijun Sun, Redmond, WA (US); Timothy E. Onders, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1010 days.

(21) Appl. No.: 12/698,989

(22) Filed: Feb. 2, 2010

(65) Prior Publication Data

US 2011/0187733 A1    Aug. 4, 2011

(51) Int. Cl.
| | |
|---|---|
| G09G 5/02 | (2006.01) |
| G09G 3/34 | (2006.01) |
| G09G 5/06 | (2006.01) |
| H04N 21/422 | (2011.01) |
| H04N 21/431 | (2011.01) |
| H04N 5/58 | (2006.01) |
| H04N 5/202 | (2006.01) |
| G06T 5/00 | (2006.01) |

(52) U.S. Cl.
CPC ........... *H04N 5/58* (2013.01); *H04N 21/42202* (2013.01); *H04N 21/4318* (2013.01); *H04N 5/202* (2013.01); *G09G 3/3406* (2013.01); G09G 2360/144 (2013.01); G09G 2320/0673 (2013.01); G09G 2320/0646 (2013.01); *G06T 5/009* (2013.01); G09G 2320/0633 (2013.01)
USPC ............................. 345/589; 345/207; 345/590

(58) Field of Classification Search
CPC ........ H04N 5/58; H04N 5/202; G09G 3/3406
USPC ....................................................... 345/589
See application file for complete search history.

(56) References Cited

U.S. PATENT DOCUMENTS 4,364,084 A  *  12/1982  Akimoto et al. ............... 358/506
5,712,474 A  *   1/1998  Naneda ....................... 250/208.1

(Continued)

FOREIGN PATENT DOCUMENTS

| | | |
|---|---|---|
| CN | 101207709 A | 6/2008 |
| EP | 1538592 | 6/2005 |

(Continued)

OTHER PUBLICATIONS

L. Kerofsky et al., "Brightness Preservation for LCD Backlight Dimming," Sharp Laboratories of America, Inc., retrieved Dec. 1, 2009, downloaded from the World Wide Web at http://www.sharp.co.jp/corporate/rd/30/pdf/95_11.pdf.

(Continued)

*Primary Examiner* — Kee M Tung
*Assistant Examiner* — Yuehan Wang
(74) *Attorney, Agent, or Firm* — Timothy Churna; Kate Drakos; Micky Minhas

(57) ABSTRACT

The enhancement of images to be displayed on a liquid crystal display (LCD) comprises remapping initial pixel values to remapped pixel values in accordance with an equation that raises an initial pixel value to an exponent of a modified gamma value ratio. The modified gamma value ratio is based on a backlight level, an ambient light level and/or other light levels associated with the LCD. The enhancement can selectively increase image brightness in response to a reduction in the backlight level or an increase in the ambient light level, or selectively reduce image brightness in response to a reduction in the ambient light level. The image or a portion of the image can be enhanced. An image portion to be enhanced can be a user-specified bounding box or one or more windows selected by a user or associated with one or more applications running on a computing device.

24 Claims, 9 Drawing Sheets

(56) References Cited

U.S. PATENT DOCUMENTS

| | | | |
|---|---|---|---|
| 7,414,598 B2* | 8/2008 | Lee | 345/63 |
| 2002/0161835 A1* | 10/2002 | Ball et al. | 709/203 |
| 2003/0231192 A1* | 12/2003 | Kaneyasu | 345/690 |
| 2004/0066979 A1* | 4/2004 | Gindele et al. | 382/274 |
| 2004/0095402 A1* | 5/2004 | Nakano | 346/102 |
| 2005/0213120 A1* | 9/2005 | Ohkawa et al. | 358/1.9 |
| 2006/0047704 A1* | 3/2006 | Gopalakrishnan | 707/104.1 |
| 2006/0164408 A1* | 7/2006 | Nishikawa et al. | 345/207 |
| 2006/0274026 A1* | 12/2006 | Kerofsky | 345/102 |
| 2006/0284822 A1* | 12/2006 | Kerofsky et al. | 345/102 |
| 2006/0290626 A1* | 12/2006 | Arimoto et al. | 345/87 |
| 2007/0013725 A1* | 1/2007 | Burkhardt et al. | 345/690 |
| 2007/0035565 A1* | 2/2007 | Kerofsky | 345/690 |
| 2007/0092139 A1* | 4/2007 | Daly | 382/169 |
| 2007/0183678 A1 | 8/2007 | Sankar et al. | |
| 2007/0291048 A1 | 12/2007 | Kerofsky | |
| 2008/0001881 A1* | 1/2008 | Baba et al. | 345/89 |
| 2008/0074516 A1* | 3/2008 | Bussmann | 348/254 |
| 2008/0198117 A1* | 8/2008 | Kumakura | 345/89 |
| 2008/0284721 A1 | 11/2008 | Hasegawa | |
| 2008/0297451 A1* | 12/2008 | Marcu | 345/77 |
| 2009/0115719 A1 | 5/2009 | Lin et al. | |
| 2009/0219244 A1 | 9/2009 | Fletcher et al. | |
| 2010/0091050 A1* | 4/2010 | El-Ghoroury et al. | 345/691 |
| 2010/0128067 A1* | 5/2010 | Lee | 345/690 |
| 2012/0013635 A1* | 1/2012 | Beeman et al. | 345/590 |

FOREIGN PATENT DOCUMENTS

| | | |
|---|---|---|
| EP | 1701331 A1 | 9/2006 |
| EP | 1993088 | 11/2008 |
| EP | 2124218 A2 | 11/2009 |
| KR | 10-2006-0081218 | 7/2006 |
| KR | 10-2008-0068343 | 7/2008 |
| KR | 10-2009-0050268 | 5/2009 |

OTHER PUBLICATIONS

"Dolby's Backlighting Solution," retrieved Dec. 1, 2009, downloaded from the World Wide Web at http://www.dolby.com/uploadedFiles/zz-_Shared_Assets/English/PDFs/Professional/dolby-hdr-video-technical-overview.pdf.
"Technical Evolution of Liquid Crystal Displays," NPG Asia Materials, dated Oct. 21, 2009, downloaded from the World Wide Web at http://www.natureasia.com/asia-materials/highlight.php?id=577.
International Search Report and Written Opinion issued in PCT/US2011/021440, Sep. 26, 2011, 9 pages.
Examination Report from Australian Patent Application No. 2011213265, dated Aug. 14, 2013, 3 pages.
Extended European Search Report dated Jul. 16, 2013, from European Patent Application No. 11740167.9, 9 pages.
Notice of Acceptance from Australian Patent Application No. 2011213265, dated Oct. 24, 2013, 2 pages.
"First Office Action and Search Report Issued in China Patent Application No. 201180008141.2", Mailed Date: Jun. 20, 2014, 12 Pages.

* cited by examiner

ENHANCEMENT OF IMAGES FOR DISPLAY ON LIQUID CRYSTAL DISPLAYS

FIELD

The present disclosure relates to the enhancement of images to be displayed on liquid crystal displays (LCDs).

BACKGROUND

Liquid crystal displays (LCDs) are used in a wide variety of modern electronic and computing devices including computer monitors, laptop computers, smart phones, handheld gaming systems and media players (portable audio players, portable video players, etc.). The widespread adoption of LCDs is due, in part, to their lower size, weight and power consumption relative to other types of displays, such as cathode ray tube (CRT) displays.

FIG. 1 shows a perspective, exploded view of various layers of a simplified conventional liquid crystal display 100. The LCD 100 includes a backlight 110, horizontal and vertical polarizing filters 120 and 130, layers of electrodes 140 and 150 and a liquid crystal layer 160. The LCD 100 includes multiple picture elements, or pixels (display pixels), that are individually controllable to display an image. The LCD 100 individually controls each pixel to control the amount of source light produced by the backlight 110 that passes through both the horizontal polarizing filter 120 and the vertical polarizing filter 130.

The backlight 110 can include one or more LEDs (light emitting diodes), electroluminescent panels or other types of light source, and can include a layer of material to diffuse light from the light source(s). The backlight 110 is capable of producing source light at varying levels of intensity for the LCD 100 overall or, in some newer designs, for different areas of the LCD 100. The term "backlight level" refers to the intensity of the source light produced by the backlight 110.

The source light produced by the backlight 110 is typically unpolarized. If light is visualized as a waveform extending along an axis, the polarization of the light is the orientation of the waveform (e.g., horizontal, vertical, or at some other angle) relative to the axis. Unpolarized light is a jumble of different polarizations. The horizontal polarizing filter 120 permits horizontally polarized light to pass through but blocks other light. The vertical polarizing filter 130 permits vertically polarized light to pass through but blocks other light. Without the liquid crystal layer 160, all light from the backlight 110 would be blocked by the series of two polarizing filters 120, 130. In the liquid crystal layer 160, however, molecules of liquid crystal at the position of a display pixel "twist" the light passing through such that horizontally polarized light becomes vertically polarized as it moves away from the backlight 110. The vertically polarized light can then pass through the vertical polarizing filter 130.

The degree of horizontal-to-vertical polarization change at a display pixel of the LCD 100 can be controlled by changing the amount of electrical current flowing between electrodes 140, 150 at the display pixel. The amount of light allowed to pass through the LCD 100 for each display pixel is thus determined by the amount of electrical current applied across the electrodes 140 and 150 at the pixel, where the amount of current applied can be controlled depending on desired pixel value intensity. Generally, the more intense, or brighter, the pixel value, the greater the amount of source light that is allowed to pass through the LCD 100 at the corresponding display pixel. For example, in one type of conventional LCD, nematic molecules twist light from horizontal to vertical polarization when the nematic molecules are in a "relaxed" state in which no current is applied, which permits light to pass through the vertical polarizing filter 130. The nematic molecules realign along the direction of current flow, however, when current is applied across the electrodes 140, 150. The degree of realignment depends on the strength of the current, permitting different amounts of light to pass through the vertical polarizing filter 130. When enough current is applied, the polarization of the horizontally polarized light is unchanged at the liquid crystal layer 160, so that the light is blocked by the vertical polarizing filter 130.

An image or frame to be displayed on the LCD 100 includes multiple pixels (image pixels) that have one or more pixel values and are associated during the display process with corresponding ones of the multiple display pixels on the LCD 100. For example, a single image pixel can have three pixel values corresponding to red, green and blue intensities, respectively, and the three pixel values can be combined to form any of a wide range of colors for the image pixel. On the LCD 100, a display pixel can include red, green and blue sub-pixels that are individually controlled by electrodes 140, 150 to set different intensities depending on the pixel values of the image pixel.

Different kinds of LCDs can use different mechanisms to control electrodes, different varieties of liquid crystals and different types of light sources for the backlight. Although LCDs consume less power than other types of displays, they can account for a large portion of the power consumed by computing devices, and the backlight uses much of the power consumed by a LCD. Thus, it is desirable, particularly for portable electronic devices, to reduce LCD power consumption to extend battery life and also save energy. LCD power consumption can be reduced by decreasing the intensity of the source light produced by the backlight 110. However, with reduced backlight intensity, the brightness of a displayed image is reduced, which can cause detail to be lost or otherwise hurt image quality as perceived by the viewer. Image quality as perceived by the viewer can also suffer in certain ambient light conditions. If the level of ambient level increases, a displayed image can be more difficult for a user to view, or a user can perceive less detail in the image.

Thus, there is a need for efficient, effective ways to enhance images to be displayed on a liquid crystal display in response to changes in backlight and ambient light levels.

SUMMARY

Image enhancement techniques are disclosed that enhance an image to be displayed on a liquid crystal display (LCD) for increased viewability considering backlight level, ambient light levels and/or other light levels associated with the LCD. In particular, the disclosed techniques allow an image to be enhanced in response to a reduction in backlight level of the LCD or changes in ambient light levels around the LCD.

In some embodiments, image enhancement techniques remap a selected pixel value of an image from an initial value to a remapped value in accordance with an equation that raises the initial value to the exponent of a modified gamma value parameter. The modified gamma value parameter is based on the initial pixel value as well as the current backlight level and/or current ambient lighting level.

For example, a portion of the image is enhanced. The image portion can be determined from a bounding box drawn by a user, or windows selected by a user or corresponding to an application running on a computing device outputting images to the LCD. Pixel values not corresponding to the image portion remain unenhanced, despite the changes in light level associated with the LCD.

Additional signal processing operations can be performed during or after image enhancement. For example, a dithering signal can be applied to the enhanced image to reduce contouring artifacts. As another example, loss of detail in the image as a result of the remapping can be detected, and the contrast can be sharpened for regions in which details were lost.

In other embodiments, the techniques can be implemented in a graphics processing unit (GPU) or other hardware component located in a computing device that outputs images to a LCD, or in the LCD itself.

The foregoing and other objects, features and advantages of the invention will become more apparent from the following detailed description, which proceeds with reference to the accompanying figures.

DETAILED DESCRIPTION

Figure 1:
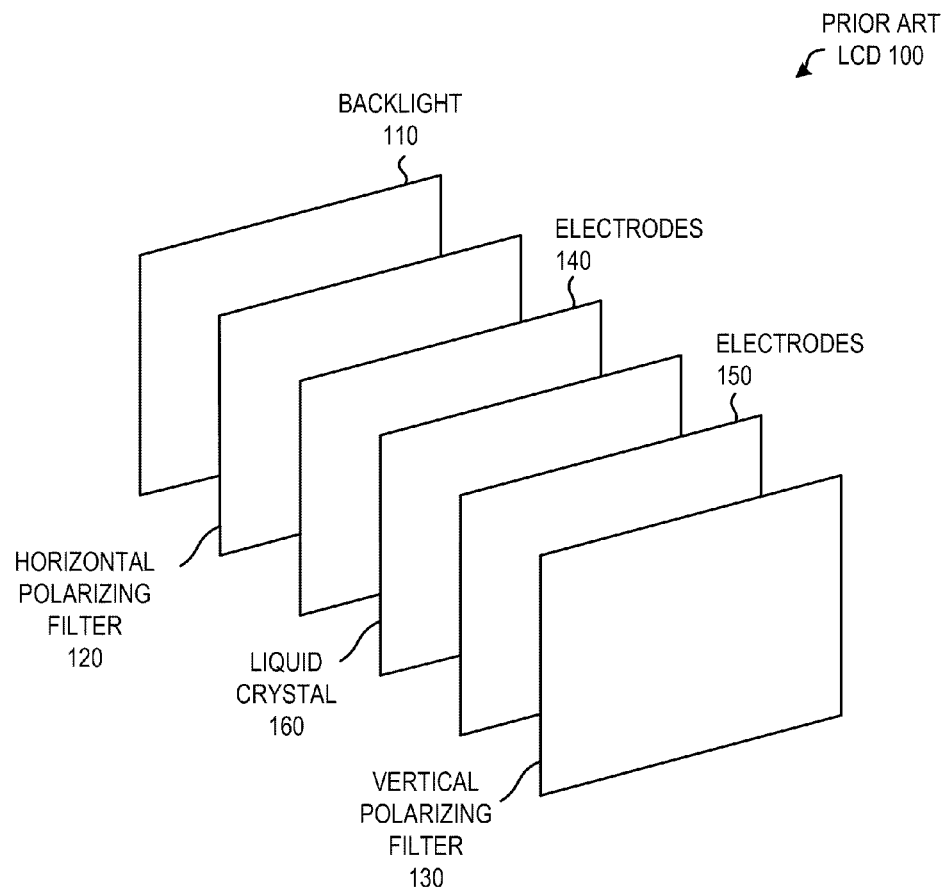
FIG. 1 is a perspective, exploded view of several layers of a simplified, conventional LCD according to the prior art.

The present application describes techniques and tools for adjusting pixel values when the backlight level of an LCD is lowered, for example, to reduce power consumption or react to changes in ambient light level. By managing the backlight level and adjusting pixel values proactively, the techniques and tools can lower power consumption while preserving display quality or enabling new display features. For example, using techniques described herein, a computing device can selectively enhance the brightness of image content, video content or other graphical content to compensate for reduction in the backlight level. In deciding which pixel values to adjust and how much the pixel values should be adjusted, the computing device can consider the desired backlight level, the current ambient light level, the content to-be-displayed, user preferences or instructions, application settings, and system settings, among other factors. As used in this application and in the claims, the singular forms "a," "an," and "the" include the plural forms unless the context clearly dictates otherwise. Additionally, the term "includes" means "comprises."

The systems, apparatus and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatus can be used in conjunction with other systems, methods and apparatuses. Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Theories of operation, scientific principles or other theoretical descriptions presented herein in reference to the apparatuses or methods of this disclosure have been provided for the purposes of better understanding and are not intended to be limiting in scope. The apparatus and methods in the appended claims are not limited to those apparatus and methods that function in the manner described by such theories of operation.

Computing Device with LCD and Image Enhancement

Figure 2:
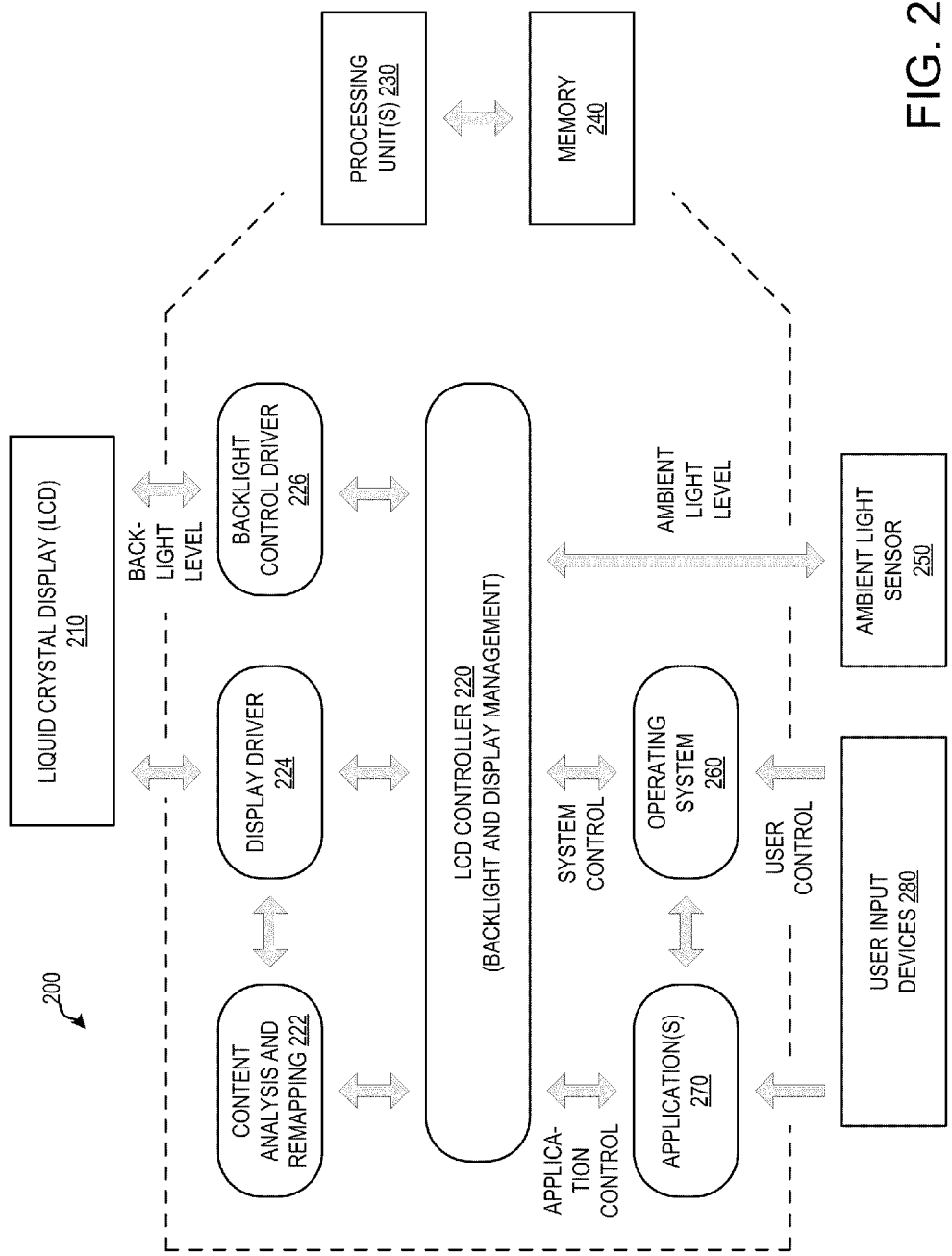
FIG. 2 is a block diagram of an exemplary computing system comprising a LCD, in which described image enhancement techniques are implemented.

Turning now to the drawings, FIG. 2 shows a block diagram of an example computing system 200. The computing system 200 includes hardware elements (shown in rectangular boxes) and functional elements (shown with rounded corners) that can be implemented in software or a combination of software and hardware.

For hardware elements, the system 200 includes a liquid crystal display (LCD) 210, one or more processing units 230, memory 240, an ambient light sensor 250 and user input devices 280. Generally, the processing unit(s) 230 and memory 240 execute software for the respective functional elements and/or implement features of the functional elements with special-purpose hardware logic. The memory can be volatile memory (e.g., registers, cache RAM), non-volatile memory (e.g., ROM, EEPROM, flash memory, etc.), or some combination of the two. The user input devices 280 can be include a keyboard, mouse, pen, trackball, touch screen, a voice input device, a scanning device, or another device that provides input to the system 200.

The system 200 can be implemented in a computing device communicatively coupled to an LCD 210 external to the device. For example, the system 200 can comprise a desktop computer comprising the process unit 230 and memory 240, outputting image data to the LCD 210 via a wired or wireless connection. Alternatively, the system 200 can be implemented in computing devices that include the LCD 210, such as a smart phone, portable gaming system, media player or other mobile, portable or handheld computing device.

The computing system 200 can have an operating system 260 and one or more applications 270 running on the processing unit(s) 230. The memory can store the operating system 260, the applications 270 and software implementing any of the technologies described herein.

The functional elements of the system 200 also include a LCD controller 220 for backlight and display management. The LCD controller 220, on its own or in combination with the content analysis and remapping module 222, processes pixel values associated with an image to be displayed on the LCD 210. Details of remapping operations in example implementations are presented below. The LCD controller 220 also generates signals for controlling the LCD backlight level. The display driver 224 buffers the result of the remapping for output to the LCD 210, and otherwise buffers image data for output to the LCD 210. The signal controlling the LCD backlight level can be provided to the LCD 210 from the controller 220 or through the backlight control driver 226. The operating system 260 can instruct the controller 220 (system control) to reduce the backlight level as part of the system 200 entering a hibernation, stand-by or other low-power state. In another example, the operating system 260 (system control) or application(s) 270 (application control) can indicate that a portion of an image is to be enhanced in response to a change in backlight level.

The operating system 260 or application(s) 270 can instruct the controller 220 to reduce the backlight level or enhance an image in response to user input 280 (user control). For example, a user can configure operating system 260 and/or application 270 parameters or settings that reduce the LCD 210 brightness (i.e., reduce the backlight level). A user can also indicate which portion of an image is to be enhanced, for example, by drawing a bounding box, selecting one or more windows displayed on the LCD 210, or selecting one or more applications whose output is displayed on the LCD 210.

The LCD controller 220, on its own or through the backlight control driver 226, can adjust the LCD backlight level and, on its own or in combination with a content analysis and remapping module 222, perform image enhancement in response to signals received from an ambient light sensor 250. The ambient light sensor 250 detects the brightness of ambient light in the vicinity or incident to the LCD and generates a signal representative thereof, which is transmitted to and received by the controller 220. The sensor 250 can be integrated into the same device as the LCD 210, or in a separate computing device that implements the controller 220. The sensor 250 can provide the ambient light level to the controller 220 at periodic intervals, at the request of the controller 220, or when the ambient level changes by a specified amount. The LCD controller 220 can monitor the ambient light level based on signals received from sensor 250 and increase or decrease the LCD backlight level accordingly. For example, the controller 220 can increase the backlight level with increases in the ambient light level to make images displayed on the LCD easier to view in bright light conditions. Similarly, the controller 220 can decrease the backlight level with decreases in the ambient light level to save power, or to avoid a LCD that appears excessively bright to a user whose pupils have adjusted to dark surroundings.

In different implementations, the LCD controller 220 can be integrated into one or more of the processing unit(s) 230, a graphics processing unit (GPU) (not shown), or any other hardware component of the computer system 200 (e.g., ASIC, etc.) or sub-component thereof. The controller 220 can be located in a computing device containing the LCD 210, a computing device separate from the LCD 210, or in the LCD 210 itself. For example, if the system 200 is a desktop computer system, the LCD controller 220 can be located in the personal computer, or in an external LCD 210. Different functionalities of the LCD controller 220 can performed by, or performed in conjunction with, the backlight control driver 226, remapping module 222 and/or display driver 224, any of which can be located in a computing device, or in a separate LCD 210. In some implementations, the functionality of the controller 220 is distributed between multiple components of the system 200. For example, some operations performed by the LCD controller 220 can be performed by a computing component of a desktop computer, and the remaining LCD controller 220 functionality can be performed by the LCD 210.

Example Images Showing Results of Image Enhancement

Figure 3:
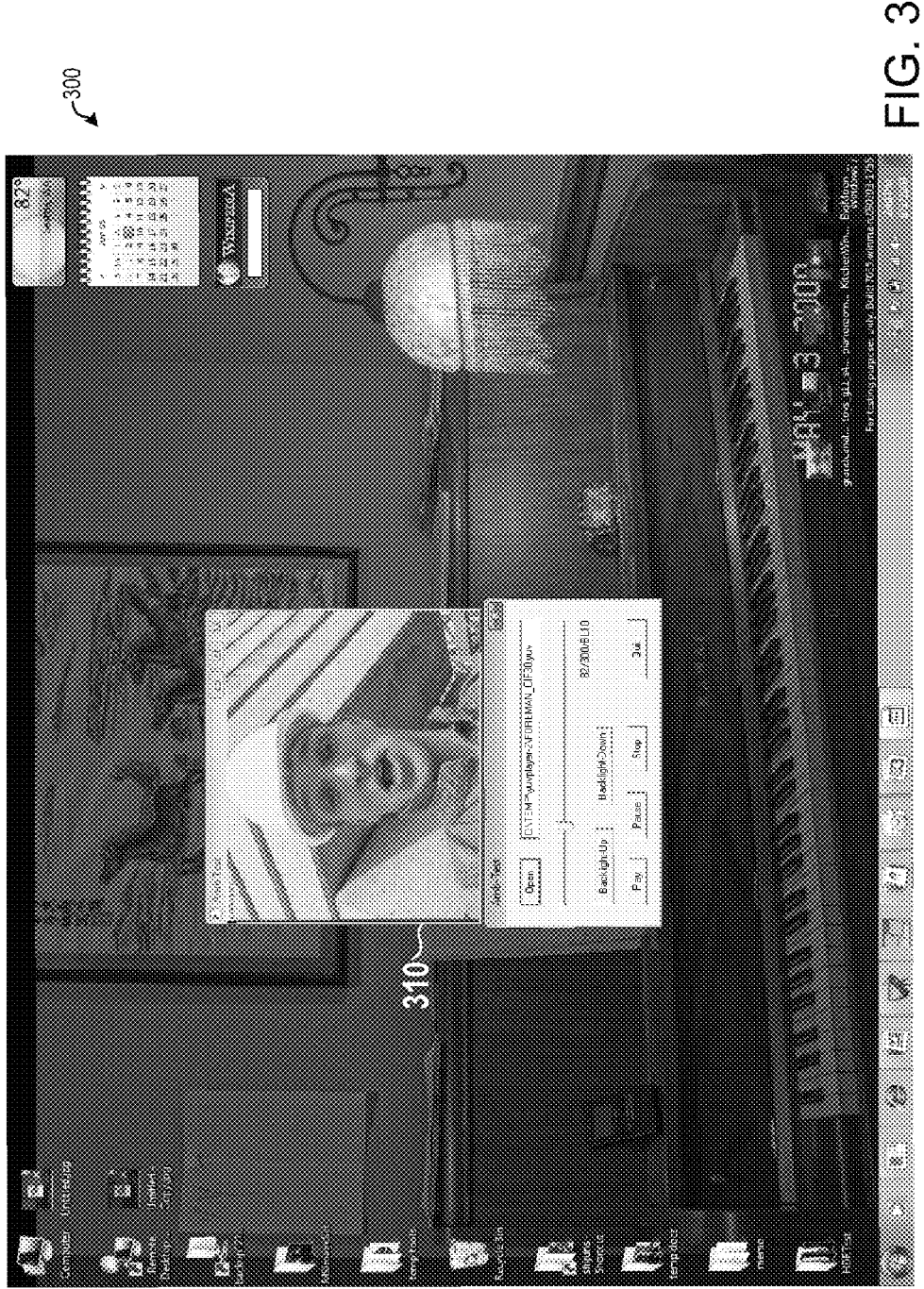
FIG. 3 is a screen shot of an image displayed on a LCD with full backlighting.
Figure 4:
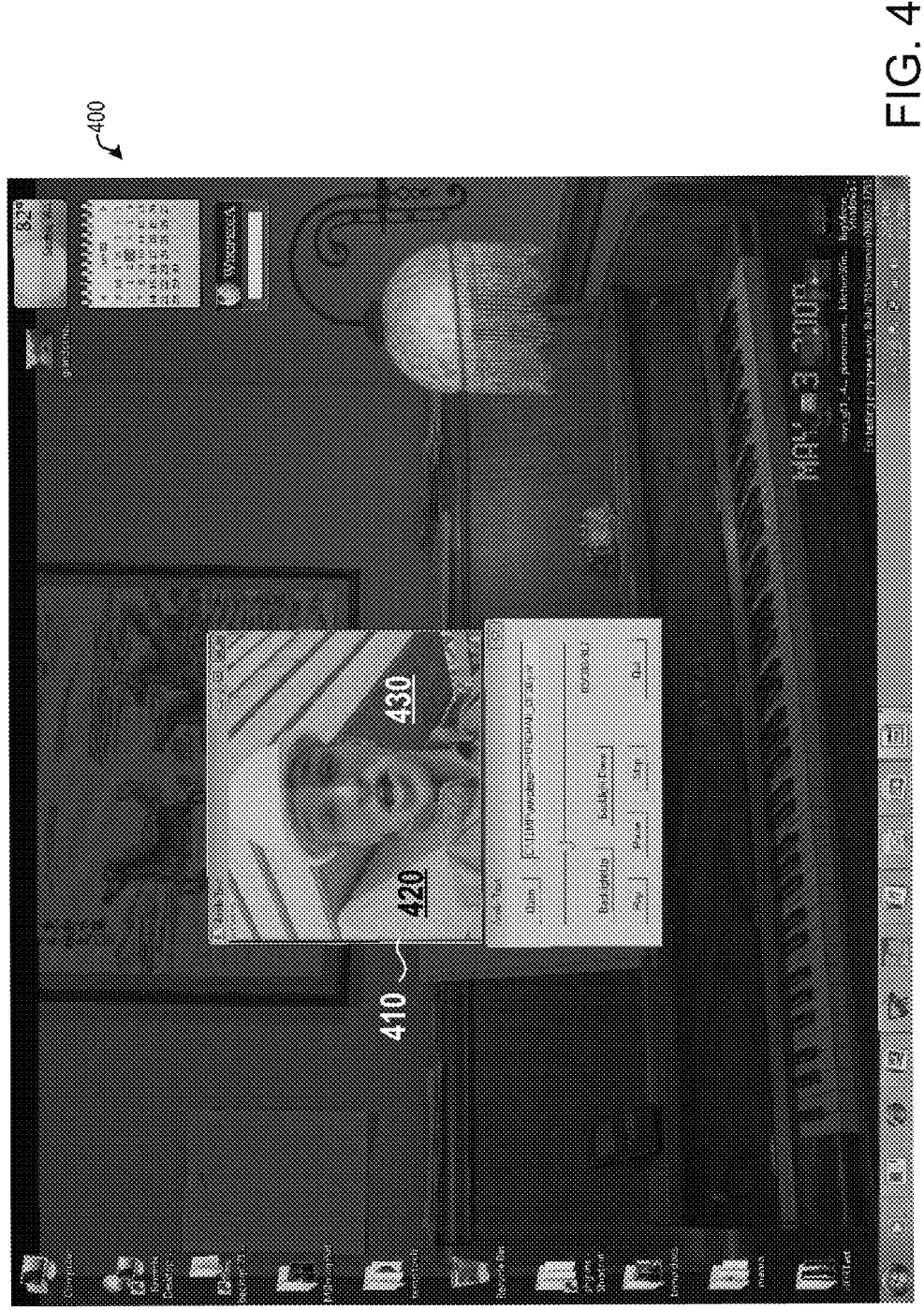
FIG. 4 is a screen shot of the image of FIG. 3 displayed on the LCD with a backlight level reduced by 25%, where the left half of the image in the center window has been enhanced.

FIGS. 3 and 4 illustrate the application of an image enhancement technique described herein to selectively increase the brightness of an image displayed on an LCD with reduced backlighting. FIG. 3 shows an image 300 displayed on a LCD with full backlighting (i.e., a backlight level of 100%). FIG. 4 shows an image 400 of the same screenshot displayed on a LCD with the backlight level reduced by 25% (i.e., a backlight level of 75%). Within a window, each image 300, 400 includes an image 310, 410 of a man wearing a helmet. In FIG. 4, the left half 420 of the image 410 is enhanced according to a method described herein to compensate for the reduction in the backlight level. The right half 430 of the image 410 is not enhanced. As can be seen, the enhanced, left half 420 is brighter than the unenhanced, right half 410 and more closely resembles the brightness of the image 310 displayed with full backlighting.

In particular, due to the physical limitations of the reduced backlight level, the relatively bright areas of the image 410 (e.g., the helmet) in both halves 420, 430 become dimmer, but the enhancement technique increases the brightness of details in other areas (e.g., shadows, jacket) of the left half 420 to more closely match the original image 310. For a selected display area such as an image rendering window or video rendering window, the enhancement helps preserve the visibility of details in relatively darker areas, instead of letting those details become lost due to dimming with the reduced backlight level.

Example Tone Curves and Theoretical Basis

Figure 5:
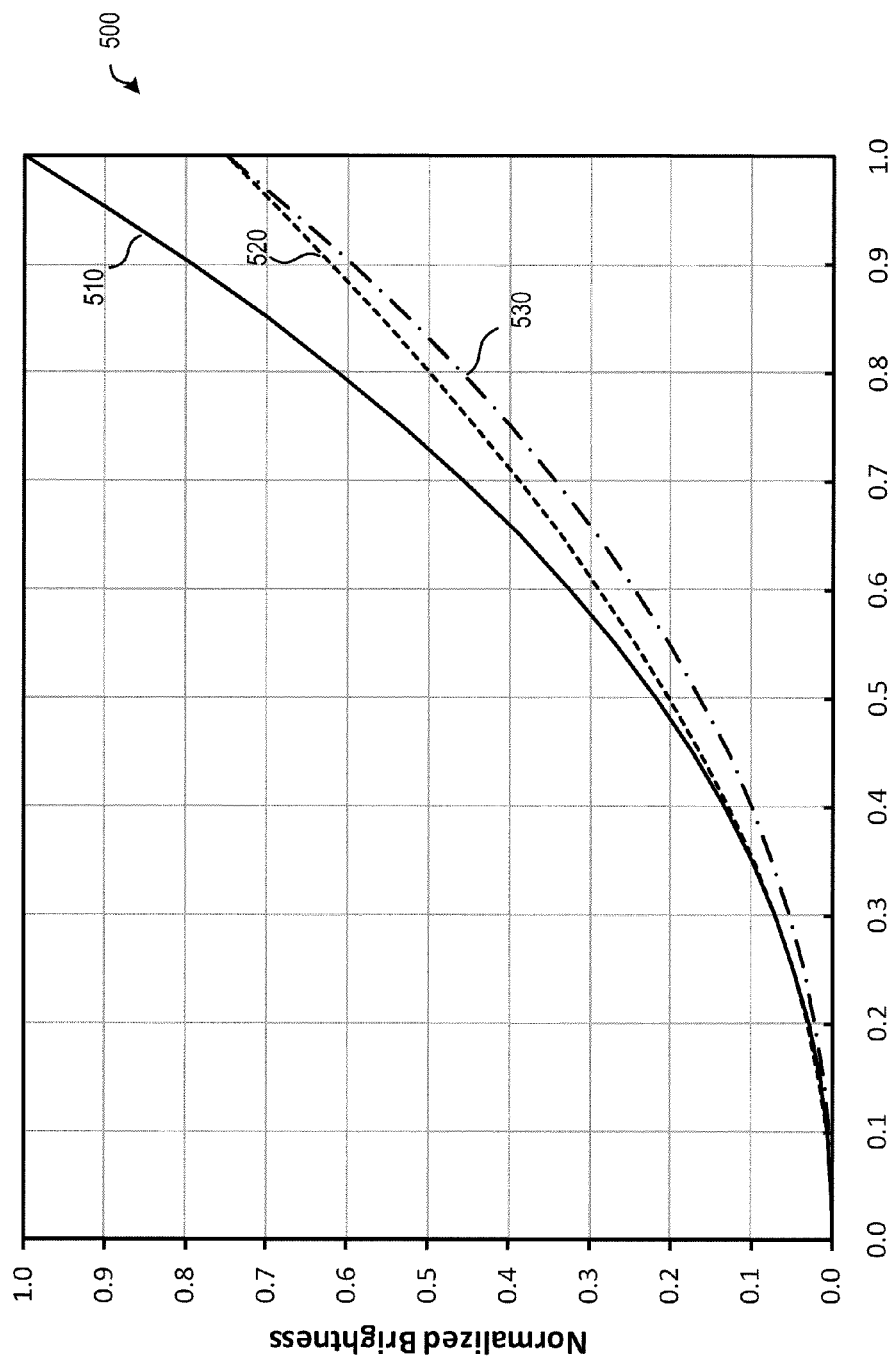
FIG. 5 is a plot showing exemplary tone curves for an image displayed at full backlighting level, reduced backlighting level with remapping for image enhancement, and reduced backlighting level without remapping.

FIG. 5 is a plot 500 that shows tone curves 510, 520, 530 for pixels values in the images 310 and 410 of FIGS. 3 and 4. Each tone curve shows the relationship between luma pixel values and the brightness of a display pixel displayed according to the pixel value. In FIG. 5, the luma pixel values are normalized by the maximum pixel value (e.g., 255 for an image with an 8-bit color depth, 1023 for 10-bit color depth), and the brightness is normalized by the brightness of a display pixel displayed with full backlighting (100% backlight level) and according to the maximum pixel value. Alternatively, instead of indicating the overall brightness of a luma pixel value, the brightness can represent the intensity of a red, green or blue sub-pixel of a display pixel.

The tone curves 510, 520, 530 reflect the non-linear relationship between the signal applied across the electrodes of an LCD for a display pixel (which corresponds to an associated pixel value), and the corresponding brightness of the display pixel. The relationship between display pixel brightness and image pixel value can be expressed by the equation:

$$\text{brightness} = \text{pixel value}^\gamma \qquad \text{(Eq. 1)},$$

where γ is a gamma value associated with a particular LCD display. The value of γ can vary according to the type of display used. In FIG. 5, the tone curves 510, 520, 530 are associated with a display having a gamma value, or gamma setting, of 2.2, which is a gamma value typical for conventional cathode ray tubes and some LCDs. LCDs can have gamma values other than 2.2, and can have pixel value—brightness relationships that cannot be expressed by Equation 1. LCDs having such relationships can apply a correction to the pixel value when generating the signal voltage applied to the horizontal and vertical electrodes such that the pixel value—brightness relationship can be expressed by Equation 1.

Tone curve 510 corresponds to the image 310 displayed with full backlighting, and tone curves 520, 530 correspond to image halves 420 and 430, respectively, for the image 310 displayed with a 25% reduction in backlighting. Tone curve 530 corresponds to the unenhanced image half 430, and is equal to the tone curve 510 scaled by 0.75 (representing a 25% reduction in backlighting). Tone curve 520, which corresponds to the enhanced image half 420, shows that pixel values for the enhanced image half 420 have a brightness greater than the same pixel value for the unenhanced image half 430 for most of the full range of pixel values. Relative to the tone curve 510 corresponding to a fully backlit image 310, tone curve 520 shows that pixel values for the enhanced image half 420 have a similar brightness at small pixel values, indicating that the darker regions of the image are displayed at similar brightness when display at full backlighting or reduced backlighting, when enhanced. In contrast, as shown in the tone curve 530, pixel values for the unenhanced image half 430 decrease proportionally even at small pixel values. At higher pixel values, the tone curves 520 and 530 converge, indicating that the brighter regions of enhanced and unenhanced images are displayed at approximately the same brightness level.

Example Image Enhancement Techniques

Figure 6:
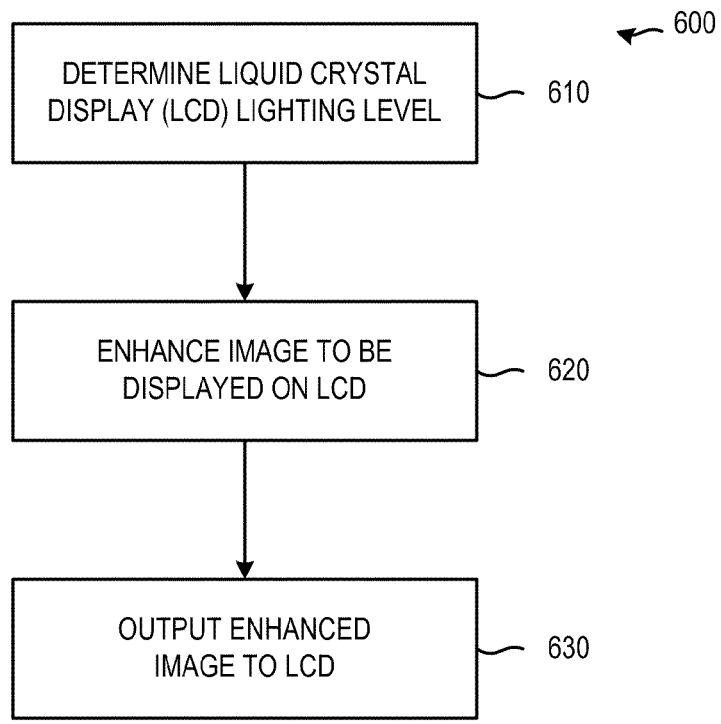
FIG. 6 is a flow chart of a generalized method of enhancing an image for output on a LCD.

FIG. 6 shows a flow chart of a generalized method 600 for enhancing an image to be displayed on a liquid crystal display. The method 600 can be executed, for example, by a laptop computer whose system settings have been configured by a user to reduce the brightness of an external LCD display due to low ambient lighting conditions. More generally, a system such as the computer system 200 described with reference to FIG. 2 performs the method 600.

At 610, the system determines a light level associated with an LCD. The light level accounts for a backlight level and/or an ambient light level. For example, the light level is a current backlight level that has been reduced or increased relative to a previous backlight level. Or, the light level is a current ambient light level that is reduced or increased relative to a previous ambient light level. In laptop computer implementations, the laptop computer can determine the current backlight level, for example, through communication with the LCD display or by accessing system variables or parameters. The laptop computer can determine the current ambient light levels through communication with the ambient light sensor or by accessing system variables or parameters. These current light levels can be compared against previous light levels stored in memory accessible by the computer system.

At 620, the system enhances the image to be displayed on the LCD. The entire image or a portion of the image can be enhanced. That is, the image can be selectively enhanced. Generally, the system remaps at least some of the pixel values of the image from initial values to remapped values. Typically, the remapped pixel values are luma values in a luma-chroma color space such as YUV, and the chroma values are not remapped.

For example, in some implementations, enhancement comprises remapping each of the to-be-remapped pixel values from an initial value to a remapped value in accordance with the following equation:

$$\text{remapped\_pixel\_value} = \text{init\_pixel\_value}^{\gamma_{ratio}} \quad \text{(Eq. 2)}$$

where $\gamma_{ratio}$ is a modified gamma value ratio, and the initial pixel value (init_pixel_value) is normalized to be within the range of 0 to 1. Alternatively, an initial pixel value is remapped by raising the initial pixel value to another type of modified gamma value parameter that selectively increases brightness to compensate for changes in the determined light level.

For equation 2 and other equations presented herein, the details of operations implementing the equation can vary depending on implementation, while still being "in accordance with" the equation. For example, an equation can be implemented with operations with lookup tables storing pre-computed associations between input and output values, or the output values can be computed from input values on-the-fly using the equation. As another example, an equation can be implemented using only the operations shown in the equation, using equivalent operations, or using additional operations. As another example, the equation can be implemented in isolation or in conjunction with other transformations of values. The equation can be implemented with operations in the order shown or implied by the equation, or operations can be rearranged with the same effect.

The modified gamma value ratio $\gamma_{ratio}$ in equation 2 is based at least in part on the determined light level and based at least in part on the initial value. For example, the modified gamma value ratio $\gamma_{ratio}$ can be expressed as:

$$\gamma_{ratio} = \frac{\gamma_{LCD}}{\gamma_{adjustment}}, \quad \text{(Eq. 3)}$$

where $\gamma_{LCD}$ is a gamma setting such as 1.8 or 2.2 for a particular LCD, and $\gamma_{adjustment}$ is a gamma adjustment.

When the remapping is used to compensate for changes in backlight level, the gamma adjustment $\gamma_{adjustment}$ of equation 3 can be expressed as:

$$\gamma_{adjustment} = \gamma_{LCD} + (\gamma_{offset\_bl} - \gamma_{LCD}) * \sqrt{\text{init\_pixel\_value}} \quad \text{(Eq. 4)}$$

where $\gamma_{offset\_bl}$ is a gamma offset value dependent on the backlight level. Example values of gamma offset values $\gamma_{offset\_bl}$ for different backlight levels are presented below.

Equation 4 yields a smooth transition of gamma adjustment values $\gamma_{adjustment}$ from $\gamma_{LCD}$ at low-level pixel values ($\gamma_{adjustment} = \gamma_{LCD}$ at an initial pixel value of zero) to $\gamma_{offset\_bl}$ at high-level pixel values ($\gamma_{adjustment} = \gamma_{offset\_bl}$ at the maximum initial pixel value of one). The square root of the initial pixel value is used a scaling coefficient for the ($\gamma_{offset\_bl} - \gamma_{LCD}$) term, as it evaluates to zero for an initial pixel value of zero, evaluates to one for a maximum pixel value of one, and has a desirable curve between initial pixel values of zero and one. Thus, Equation 4 assumes initial pixel values that are normalized. Equation 4 can be modified to accommodate pixel values that are not normalized.

In variations of equation 4, expressions other than $\sqrt{\text{init\_pixel\_value}}$ can be used as the scaling coefficient for the term ($\gamma_{offset\_bl} - \gamma_{LCD}$) to increase, decrease or otherwise modify the enhancement of the image. For example, the scaling coefficient can be a function that produces a greater or lesser magnitude of enhancement (i.e., initial pixel values remapped by greater or lesser amounts) for the given initial pixel values.

The offset gamma value, $\gamma_{offset\_bl}$, can be computed as needed from the determined light level, retrieved from look-up tables stored in memory of a computer system, or determined as some combination of retrieval and computation. Continuing the laptop computer example, a $\gamma_{offset\_bl}$ look-up table can be stored in resident memory of the laptop computer. Table 1 shows several entries in an exemplary look-up table containing $\gamma_{offset\_bl}$ values for an LCD having a $\gamma_{LCD}$ of 2.2.

TABLE 1

| Backlight value (normalized) | $\gamma_{offset\_bl}$ |
|---|---|
| 1.0 (full backlight level) | 2.200 |
| 0.9 | 2.379 |
| 0.8 | 2.571 |
| 0.7 | 2.832 |

The values of $\gamma_{offset\_bl}$ increase with decreasing backlight level, tending to cause a greater amount of image enhancement for larger levels of backlight reductions. Table 1 also shows that the $\gamma_{offset\_bl}$ values generally increase monotonically with decreasing backlight value.

When the remapping is used to compensate for changes in ambient light level, the remapped pixel value remapped_pixel_value and gamma adjustment $\gamma_{adjustment}$ of equations 2 and 4 can be expressed as:

$$\text{remapped\_pixel\_value} = [(\text{init\_pixel\_value}^{\gamma_{LCD}})*(1-a)+a]^{1/\gamma_{adjustment}} \quad (Eq. 5)$$

$$\gamma_{adjustment} = \gamma_{LCD} + \frac{(\gamma_{offset\_amb} - \gamma_{LCD})*}{\sqrt{1-\text{init\_pixel\_value}}} \quad (Eq. 6)$$

where $\gamma_{offset\_amb}$ is a gamma offset value dependent on the ambient light level and a is a scaling parameter that can be expressed as:

$$a = b^{(\gamma_{offset\_amb}/\gamma_{LCD})}, \quad (Eq. 7)$$

where b is the ambient light level or target brightness to be used for low-level pixels values. Example values of gamma offset values $\gamma_{offset\_amb}$ for different ambient light levels are presented below in Table 2. With this gamma adjustment $\gamma_{adjustment}$, the remapped pixel value remapped_pixel_value is based at least in part on a determined light level and based at least in part on the initial pixel value Equations 5-7 yield a smooth transition for the remapped pixel value (remapped_pixel_value) from a non-zero value at low-level pixel values ($\gamma_{adjustment} = \gamma_{offset\_amb}$) and remapped_pixel_value=$a^{1/\gamma_{offset\_amb}}$ at an initial pixel value of zero) to 1.0 at high-level pixel values. Thus, in response to an increase an ambient lighting, the method 600 can operate to primarily enhance the darker regions of an image, increase mid-level brightness regions by a lesser amount that the darker regions, and keep the high-level brightness regions at approximately the same brightness as the unenhanced image.

In variations of equations 5-7, different expressions provide a smooth transition from a non-zero value to 1.0 with increasing pixel values for remapping_pixel_value. The offset gamma value $\gamma_{offset\_amb}$ can be computed as needed from the determined light level, retrieved from look-up tables stored in memory of a computer system, or determined as some combination of retrieval and computation. Again, continuing the laptop computer example, a $\gamma_{offset\_amb}$ look-up table can be stored in resident memory of the laptop computer.

Table 2 shows several entries in an exemplary look-up table containing $\gamma_{offset\_amb}$ values for an LCD having a $\gamma_{LCD}$ of 2.2. Although remapping only occurs for non-zero ambient light values b, this does not mean that a system employing the methods described herein will always enhance images unless the system is in complete darkness. An ambient lighting floor can be specified. If the ambient lighting level is below this specified floor, the ambient light value b will be considered to be 0.0, and no remapping or image enhancement will occur.

TABLE 2

| Ambient light value (b, normalized) | $\gamma_{offset\_amb}$ |
|---|---|
| 0.01 | 2.1 |
| 0.02 | 1.9 |
| 0.03 | 1.8 |
| 0.05 | 1.5 |
| 0.10 | 1.75 |
| 0.20 | 2.2 |
| 0.30 | 2.8 |
| 0.40 | 3.2 |
| 0.50 | 3.8 |

In the example mapping shown in Table 2, $\gamma_{offset\_amb}$ decreases and then increases as the ambient light values changes from 0.03 to 0.05 to 0.1. Thus, a $\gamma_{offset}$ (e.g., either $\gamma_{offset\_bl}$ or $\gamma_{offset\_amb}$) look-up table can contain a small number of entries and require a small amount of memory. Gamma offset values corresponding to backlight or ambient lighting values for which there is no corresponding entry in a look-up table can be interpolated from existing entries using linear interpolation or another form of interpolation. Alternatively, $\gamma_{offset\_bl}$ and $\gamma_{offset\_amb}$ can be calculated in real-time during the remapping process by software executing on or hardware (i.e., a GPU) located in a computer system.

Similarly, after the gamma offset values have been determined, the gamma adjustment values $\gamma_{adjustment}$ can be calculated for each pixel value during remapping as it occurs at process block 620. Alternatively, possible values for $\gamma_{adjustment}$ can be calculated for each possible pixel value after the gamma offset values are determined, and the resulting $\gamma_{adjustment}$ values can be stored in a look-up table or other data structure indexed by initial pixel value. Thus, the remapping can comprise retrieving $\gamma_{adjustment}$ values from a data structure for any given initial pixel value in an image, thus avoiding having to recalculate $\gamma_{adjustment}$ values during the remapping. Remapped pixel values (remapped_pixel_value) may similarly be calculated on the fly or pre-calculated and stored in a look-up table or other data structure.

Moreover, equations for $\gamma_{adjustment}$ and/or remapped_pixel_value that depend on both the backlight level and the ambient light level can be used for pixel value remapping as well. As another alternative, instead of calculating the gamma adjustment $\gamma_{adjustment}$ and/or remapped_pixel_value considering a single initial pixel value, the remapping can consider other pixel values in a neighborhood around the pixel value to-be-enhanced, for example, to increase contrast in a dark region by enhancing dark pixel values, but not adjust the dark pixel values to the same extent when they are surrounded by bright pixel values.

Returning to FIG. 6, after the image is enhanced at 620, the system outputs the enhanced image to the LCD at 630. Outputting an enhanced image to an LCD can comprise, for example, a computing device sending the remapped pixel values to an external LCD, or an LCD controller or other component of a computing device sending the enhanced image data to an LCD integrated into the device.

Example Remappings of Pixel Values

Figure 7:
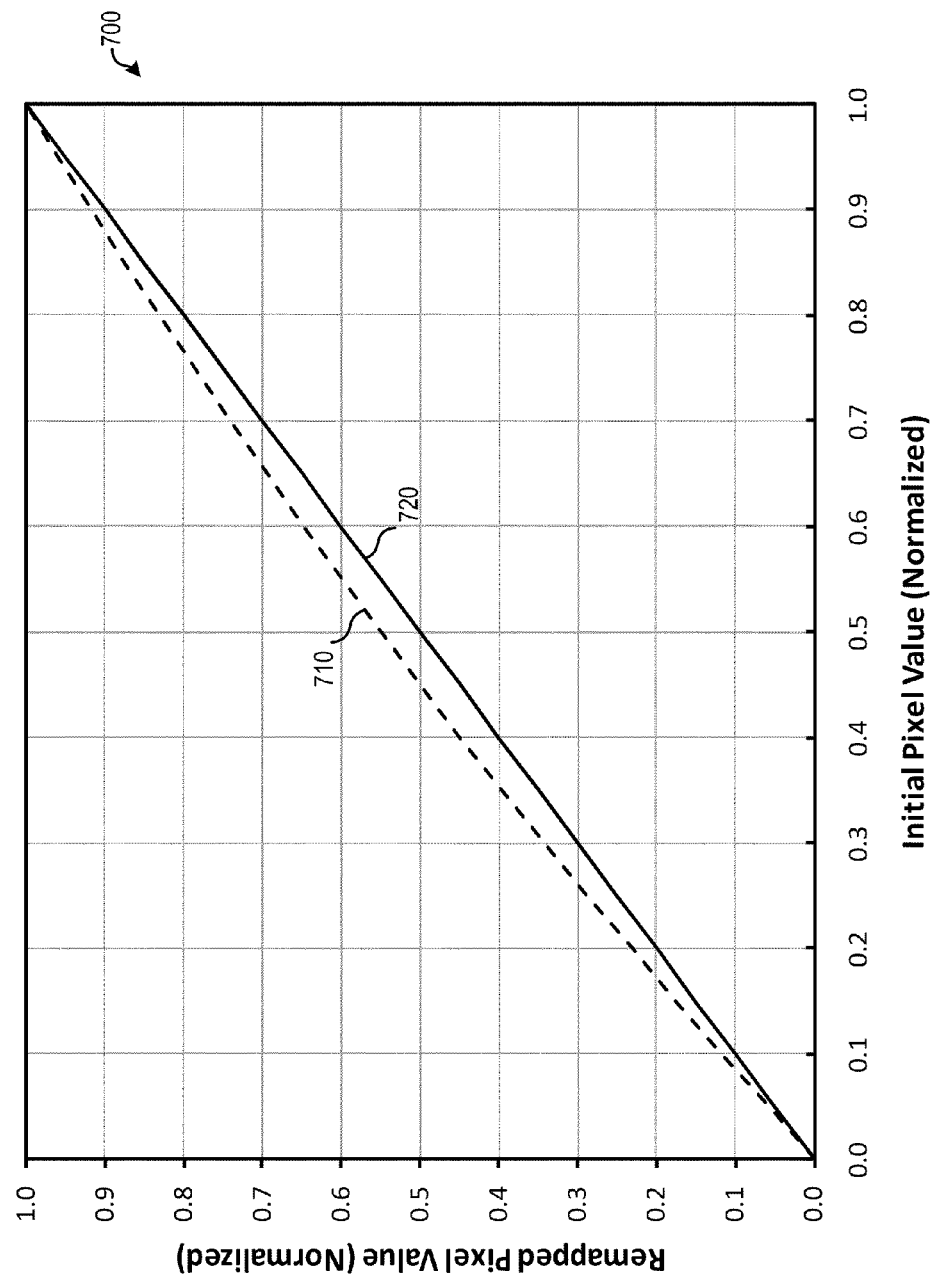
FIG. 7 is a plot showing an exemplary remapping of pixel values corresponding to a decrease in backlight level.

FIG. 7 is a plot 700 of curves 710 and 720 showing the relationship between initial pixel values and remapped pixel values for a current backlight level reduced by 25% from a previous full backlight level, and for an LCD having a gamma of 2.2 ($\gamma_{LCD}$=2.2). The gamma offset value is 2.70 ($\gamma_{offset\_bl}$=2.70), linearly interpolated from the $\gamma_{offset\_bl}$ values 2.571 and 2.832 shown in Table 1 for normalized backlight levels of 0.7 and 0.8 (reductions of 30% and 20%, respectively).

Curve 720 is a reference curve with no modification between initial and remapped pixel values (i.e., the remapped pixel values are the same as the initial pixel values). Curve 710 shows a remapping of initial pixel values to greater remapped pixel values in response to a backlight level reduction, with mid-level pixel values being remapped by a greater amount than low-level or high-level values.

Referring back to FIG. 5, curve 520 is the tone curve for the enhanced image half 420 of FIG. 4. The brightness of the remapped pixel values can be expressed by substituting Equation 2 into Equation 1:

$$\text{brightness} = \text{initial\_pixel\_value}^{\left(\frac{\gamma_{LCD} \cdot \gamma_{LCD}}{\gamma_{adjustment}}\right)}. \quad \text{Eq. (8)}$$

As discussed above, tone curve 520 indicates that dark regions of the enhanced image half 420, displayed with reduced backlighting, have a brightness perceived to be similar to that of the unenhanced image 310 displayed with full backlighting. At the same time, with the reduced backlighting, the mid-level (and upper-level) pixel values of the enhanced image half 420 are brighter than (or as bright as) the unenhanced image half 430, but noticeably dimmer than the corresponding pixel values for the unenhanced image 310 displayed with full backlighting.

Figure 8:
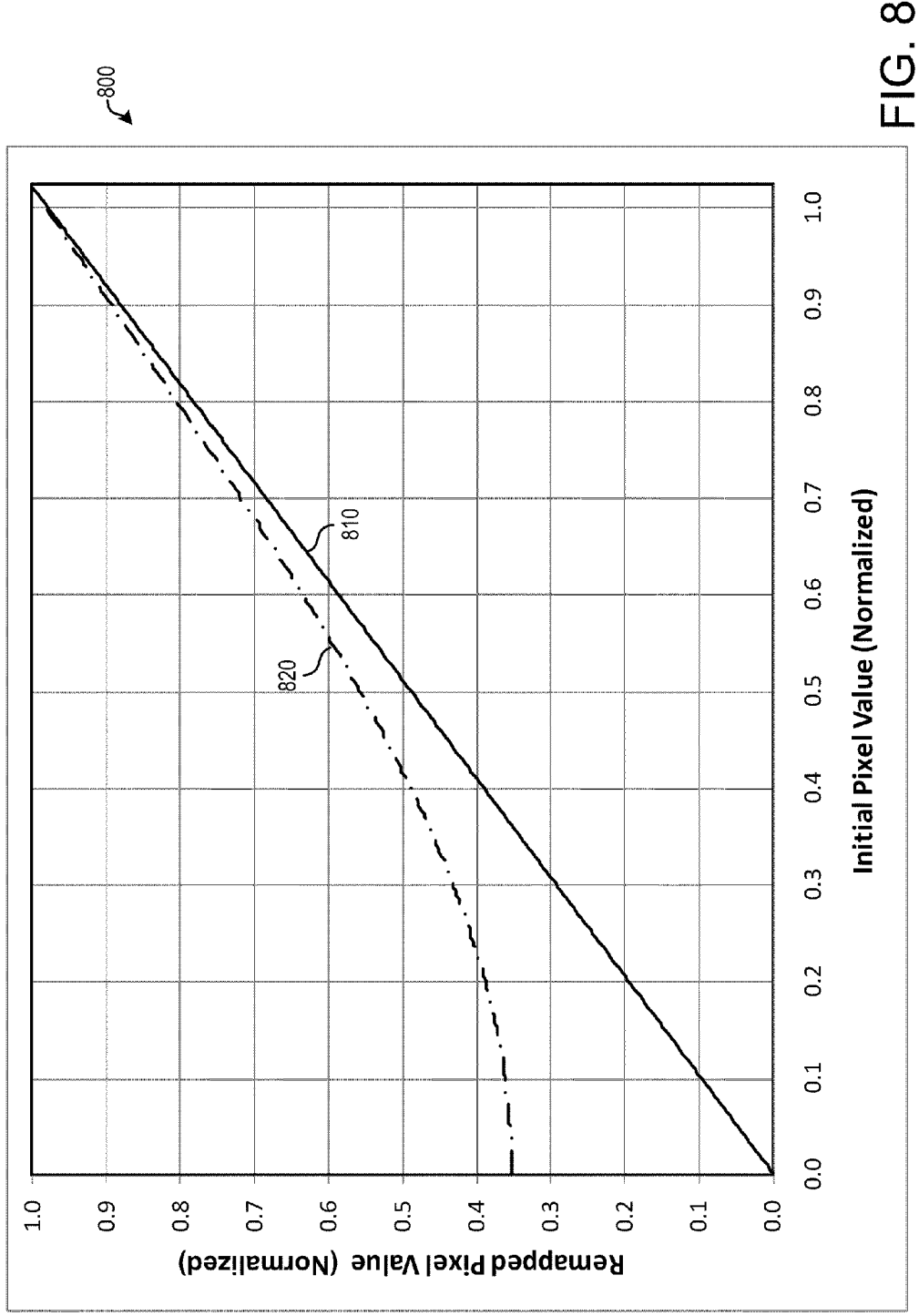
FIG. 8 is a plot showing an exemplary remapping of pixel values corresponding to an increase in ambient lighting level.

FIG. 8 is a plot 800 of curves 810 and 820 showing the relationship between initial pixel values and remapped pixel values for a current ambient lighting level of 0.1 (b=0.1) and for an LCD having a gamma of 2.2 ($\gamma_{LCD}$=2.2). The gamma offset value is 1.75 ($\gamma_{offset\_amb}$=1.75). Curve 810 is a reference curve with no modification between initial and remapped pixel values (i.e., the remapped pixel values are the same as the initial pixel values). Curve 820 shows a remapping of initial pixel values to greater remapped pixel values in response to the ambient lighting level increase when b=0.1. The brightness of low-level pixel values is increased by a larger amount than the brightness of mid-level and high-level values, with the amount of increase in brightness decreasing with increasing pixel value, and with the brightness of high-level pixel values increasing by only a small amount, if at all.

Figure 9:
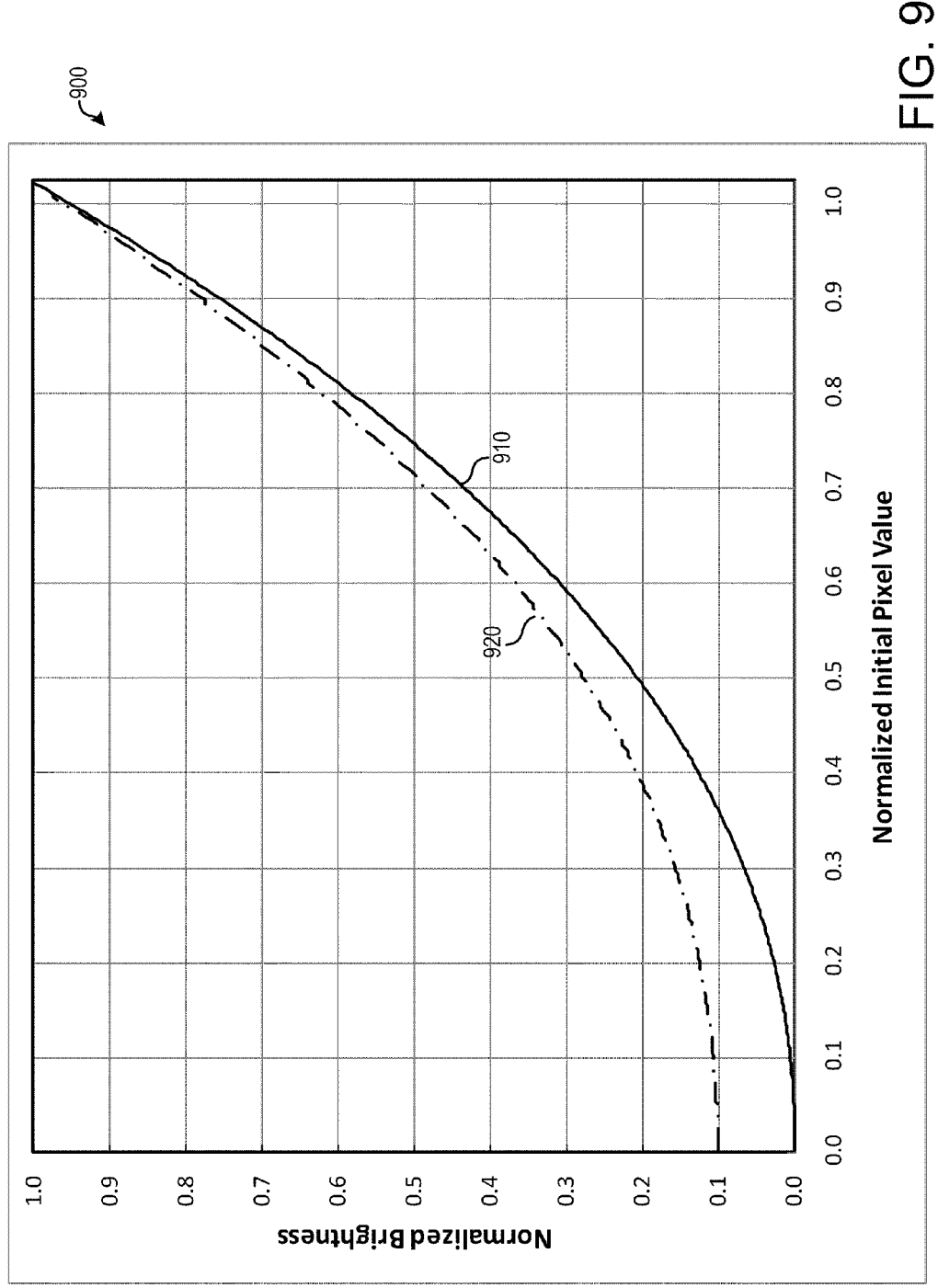
FIG. 9 is a plot showing exemplary tone curves for an image displayed with and without enhancement due to an increase in ambient lighting level.

FIG. 9 is a plot 900 of tone curves 910 and 920 for an image displayed with full LCD backlighting, with (curve 920) and without (curve 910) image enhancement due to an increase in ambient lighting level. Curve 910 is the tone curve for an unenhanced image, or for an image displayed in low ambient light conditions (i.e., the ambient light level, b=0). Tone curve 920 indicates that dark regions of an image are enhanced (noticeably brighter) under increased ambient lighting conditions, and that mid-level and upper-level pixel values are also enhanced, but by a lesser amount than the low-level pixel values. The brightness of the upper-level pixel values in the enhanced image converge with the brightness of the upper-level pixel values of the unenhanced image.

Use Scenarios and Alternatives

Although the generalized image enhancement method 600 has been described in the context of an example in which initial pixel values are remapped to greater pixel values to selectively increase the brightness of an image, image enhancement also includes remapping initial pixel values to lesser pixel values in response to an increase in backlight level. For example, if a backlight level is increased in response to an increase in the ambient light level or an operating system transitioning from a low-power mode (i.e., hibernation, stand-by, etc.) to a normal mode, method 600 can remap the initial pixel values to lower pixel values to prevent the image from becoming overly bright.

Moreover, enhancing the image can comprise the application of digital signal processing (DSP) techniques in addition to, or as part of, the remapping of signal values. For example, a high-frequency dithering signal can be applied to an image being enhanced to mitigate or avoid the introduction of contouring or banding artifacts that can arise as a result of the remapping operation or backlight reduction. Banding artifacts or contouring might arise, for example, when a wide range of initial pixel values is replaced with few pixel values, and gradual changes in pixel values in the image are replaced with noticeable boundaries. The dithering signal can be added to the image after the pixel values have been remapped, using patterns added throughout the image or added only to enhanced regions in which pixel values have been remapped. The patterns can be pre-generated or generated on-the-fly before display. For example, the dithering signal perturbs sample values by a small amount such as −0.5 to 0.5 according to a Gaussian distribution around 0.

Other DSP operations can also be included as part of image enhancement. For example, image enhancement can include detecting the loss of detail in one or more regions of an image as a result of the remapping, and sharpening of the contrast in those regions. Even after remapping, details in bright areas may be lost due to reduction in backlight level, and such contrast adjustment can help preserve such detail. Conversely, remapping in a dark region can inadvertently cause distortion in the dark region to become more noticeable, and DSP operations can identify and smooth such distortion.

In some scenarios, the current backlight level is directly reduced in response to user instructions, according to user preferences, according to an application setting, or according to a system setting. In other scenarios, considering the actual backlight level, current ambient light level and image content, the system can proactively adjust pixel values while reducing the backlight level, for example, when the content of the display is mostly dark, without causing changes noticeable to the viewer.

Even when reduction in power consumption is not a goal, the image enhancement techniques described herein can be used to achieve a highlight effect. For example, in an image displayed at a reduced backlighting level, pixel values associated with a selected portion of the image can be enhanced such that the brightness of the portion is perceived to be the same as when displayed with full backlighting. The highlighted image portion can be selected by a user, an operating system or an application running on a computing device, as an active area distinguished from other inactive areas of the display. Such a highlighting feature can reduce LCD power consumption by keeping the backlight at a reduced level and allowing more of source light to pass through the display pixels associated with the image portion.

In another use scenario, the image enhancement techniques described herein are applied to normalize the brightness of content displayed on multiple monitors in use with a single computer system.

In "cloud" computing implementations in which relatively simple end-user computing devices are connected to one or more server computers through a network, an end-user device can communicate its backlight level or information about its ambient light condition to a server computer. The server computer can adjust the media content based on the backlight level or ambient light condition of the end-user device connected to the cloud. The enhanced content can then be delivered to the end-user device for display. The methods described herein can be enabled automatically or by user selection. In some embodiments, a computing device or LCD monitor incorporating an ambient light sensor can automatically reduce the backlight level and enhance an image in response to a reduction in ambient light levels. In other embodiments, a user can configure system settings (e.g., operating system settings, application settings) that control whether the image enhancements techniques disclosed herein are employed in reduced backlight level conditions.

The methods described herein can be implemented in either software or hardware, or a combination of software and hardware. For example, the methods can be implemented in an operating system, GPU firmware, or applications running on a computing device connected to an LCD, or by firmware running on a processor located in the LCD, or the functionality can be split between such components. Alternatively, part or all of the methods can be implemented in circuits located on a central processing unit, graphic processing unit or any other hardware component of a computing device outputting image data to an LCD, or in an LCD.

In addition, although examples in the application have primarily focused on remapping of luma pixel values, the methods described herein can remap pixel values in any color space. For example, an image can be enhanced by remapping the luma (Y') pixel values and not the chroma pixel values (U, V) of an image represented in the YUV (e.g., YPbPr, YCbCr) color space, or by remapping red, green and blue sub-pixel values of an image represented in the RGB color space.

In particular, to simplify implementation, for video or image content, the methods described herein can be applied to reconstructed luma pixel values output from video or image decoding. In a video card or GPU responsible for video decoding and display, a video rendering module can perform the remapping operations right after decoding, while pixel values of the video or image content are still in an 8-bit or 10-bit integer representation and luma/chroma color space.

The techniques presented herein can be described in the general context of computer-executable instructions, such as those included in program modules, or they can be described as comprising an "engine" of a system, being executed in a computing system on a target real or virtual processor. Generally, program modules include routines, programs, libraries, objects, classes, components, data structures, etc., that perform particular tasks or implement particular abstract data types. The functionality of the program modules can be combined or split between program modules as desired in various embodiments. Computer-executable instructions for program modules can be executed within a local or distributed computing system or environment.

Any of the methods described herein can be implemented by computer-executable instructions in one or more computer-readable media (e.g., computer-readable storage media or other tangible media). Such instructions can cause a computer system to perform the described method. The technologies described herein can be implemented in a variety of programming languages.

Having illustrated and described the principles of the illustrated embodiments, the embodiments can be modified in various arrangements while remaining faithful to the concepts described above. In view of the many possible embodiments to which the principles of the disclosed invention can be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing device that includes a processor and memory, a method comprising:

determining a light level associated with a liquid crystal display, the determined light level accounting for at least one of a backlight level or an ambient light level;

enhancing an image to be displayed on the liquid crystal display, the image comprising a plurality of pixels having pixel values, including, for respective pixels of at least some of the plurality of pixels:

determining a modified gamma value parameter, wherein the modified gamma value parameter depends on a ratio set in accordance with $\gamma_{LCD}/\gamma_{adjustment}$, wherein $\gamma_{LCD}$ is a gamma setting for the liquid crystal display, and wherein $\gamma_{adjustment}$ is a gamma adjustment based at least in part on a gamma offset value determined as a function of at least one of the ambient light level or the backlight level; and remapping a pixel value of the pixel from an initial value of the pixel to a remapped value in accordance with an equation that raises the initial value to the exponent of the modified gamma value parameter; and outputting the enhanced image for display on the liquid crystal display.

2. The method of claim 1, wherein:

the backlight level is a current backlight level that has been reduced relative to a previous backlight level, and the remapping selectively increases brightness of the image; or the ambient light level is a current ambient light level that has decreased relative to a previous ambient light level, and the remapping selectively decreases the brightness of the image; or the ambient light level is a current ambient light level that has increased relative to the previous ambient light level, and the remapping selectively increases the brightness of the image.

3. The method of claim 1, wherein the remapped pixel values are associated with a portion of the image to be displayed, and wherein pixel values not associated with the portion are not remapped.

4. The method of claim 3, wherein the backlight level is a current backlight level that has been reduced relative to a previous backlight level and the remapping increases the brightness of the pixels associated with the portion of the image such that the portion of image displayed at the current backlight level is displayed at a brightness perceptually the same as a brightness when the portion of the image was displayed at the previous backlight level.

5. The method of claim 3, wherein the portion corresponds to one or more windows in the image.

6. The method of claim 5, wherein the one or more windows are selected by a user.

7. The method of claim 5, wherein the one or more windows are associated with one or more applications executing on the computing device.

8. The method of claim 1, wherein the gamma offset value is retrieved from a stored plurality of gamma offset values indexed by backlight level or ambient light level.

9. The method of claim 1, wherein the enhancing further comprises:
calculating a plurality of modified gamma value parameters, each modified gamma value parameter being based at least in part on the determined light level and a possible pixel value; and
storing the plurality of modified gamma value parameters in the memory, the plurality of modified gamma value parameters indexed by corresponding possible pixel value;
wherein the determining the modified gamma value parameter comprises retrieving from the memory one of the plurality of modified gamma value parameters based on the initial value of the pixel value being remapped.

10. The method of claim 1, wherein $\gamma_{adjustment}$ is set in accordance with $\gamma_{adjustment} = \gamma_{LCD} + (\gamma_{offset} - \gamma_{LCD}) \times \text{scale}_{pixel\_value}$, wherein $\gamma_{offset}$ is the gamma offset value, and wherein $\text{scale}_{pixel\_value}$ is a scaling factor dependent on the initial value of the pixel value being remapped.

11. The method of claim 10, wherein $\gamma_{offset}$ is determined as a function of the backlight level.

12. The method of claim 10, wherein $\gamma_{offset}$ is determined as a function of the ambient light level.

13. The method of claim 10, wherein $\gamma_{offset}$ is determined as a function of the backlight level and the ambient light level.

14. The method of claim 1, wherein the enhancing comprises selectively performing the remapping for luma samples of the image but not for chroma samples of the image.

15. The method of claim 1, further comprising receiving metadata associated with gamma characteristics of the liquid crystal display, the modified gamma value parameter being further based on a gamma setting derived from the received metadata.

16. The method of claim 1, wherein the enhancing further comprises applying a dithering signal to the image to be displayed, wherein the dithering signal is applied to the image to be displayed after the remapping.

17. The method of claim 1, wherein a server computer performs the determining the light level by receiving information that indicates the light level from an end-user computing device that includes the liquid crystal display, wherein the server computer performs the enhancing, and wherein the outputting the enhanced image comprises sending the enhanced image from the server computer to the end-user device.

18. The method of claim 1, wherein the enhancing further comprises:
detecting one or more portions of the image in which details have been lost due to the remapping; and
selectively sharpening contrast in the detected one or more portions.

19. A graphics processing unit comprising:
a processor; and
a liquid crystal display controller that enhances images using the processor, wherein the liquid crystal display controller is adapted to:
receive a light level associated with a liquid crystal display, the received light level accounting for a current backlight level, the current backlight level having been reduced relative to a previous backlight level;
enhance an image to be displayed on the liquid crystal display, the image comprising a plurality of pixel values, wherein the liquid crystal display controller remaps each of at least one of the plurality of pixel values from an initial value to a remapped value in accordance with an equation that raises the initial value to the exponent of a modified gamma value parameter, and wherein:
the modified gamma value parameter is a ratio set in accordance with $\gamma_{LCD}/\gamma_{adjustment}$,
$\gamma_{LCD}$ is a gamma setting for the liquid crystal display, and
$\gamma_{adjustment}$ is a gamma adjustment set in accordance with:

$$\gamma_{adjustment} = \gamma_{LCD} + (\gamma_{offset} - \gamma_{LCD}) \times \text{scale}_{pixel\_value},$$

$\gamma_{offset}$ is a gamma offset value determined as a function of the current backlight level, and
$\text{scale}_{pixel\_value}$ is a scaling factor dependent on the initial value of the pixel value being remapped; and
output the enhanced image for display on the liquid crystal display.

20. One or more computer-readable memory or storage devices storing computer-executable instructions for causing a computing device to perform a method, the method comprising:
receiving an indication to reduce a backlight level of a liquid crystal display;
in response to receiving the indication:
determining a light level associated with the liquid crystal display, the determined light level accounting for at least one of the backlight level or an ambient light level;
enhancing an image to be displayed on a first portion of the liquid crystal display, the image comprising a plurality of pixels having pixel values, including, for respective pixels of at least some of the plurality of pixels:
determining a modified gamma value parameter, wherein the modified gamma value parameter depends on a ratio set in accordance with $\gamma_{LCD}/\gamma_{adjustment}$, wherein $\gamma_{LCD}$ is a gamma setting for the liquid crystal display, and wherein $\gamma_{adjustment}$ is a gamma adjustment based at least in part on a gamma offset value determined as a function of at least one of the ambient light level or the backlight level; and
remapping a pixel value of the pixel by raising an initial value of the pixel to the exponent of the modified gamma value parameter to create a remapped value; and
not enhancing pixel values of pixels displayed on a second portion of the liquid crystal display; and
outputting the enhanced image for display on the liquid crystal display.

21. The memory or storage devices of claim 20, wherein the remapped pixel values are associated with a portion of the image to be displayed, and wherein pixel values not associated with the portion are not remapped.

22. The memory or storage devices of claim 21, wherein the backlight level is a current backlight level that has been reduced relative to a previous backlight level and the remapping increases the brightness of the pixels associated with the portion of the image such that the portion of the image, while displayed at the current backlight level, is displayed at a brightness perceptually the same as a brightness when the portion of the image was displayed at the previous backlight level.

23. The memory or storage devices of claim 20, wherein the enhancing further comprises:

calculating a plurality of modified gamma value parameters, each modified gamma value parameter being based at least in part on the determined light level and a possible pixel value; and storing the plurality of modified gamma value parameters, the plurality of modified gamma value parameters indexed by corresponding possible pixel value;

wherein the determining the modified gamma value parameter comprises retrieving one of the plurality of modified gamma value parameters based on the initial value of the pixel value being remapped.

24. The memory or storage devices of claim 20, wherein $\gamma_{adjustment}$ is a gamma adjustment set in accordance with $\gamma_{adjustment} = \gamma_{LCD} + (\gamma_{offset} - \gamma_{LCD}) \times scale_{pixel\_value}$, wherein $\gamma_{offset}$ is the gamma offset value, and wherein $scale_{pixel\_value}$ is a scaling factor dependent on the initial value of the pixel value being remapped.

\* \* \* \* \*